United States Patent
Uchiyama et al.

(10) Patent No.: US 7,319,439 B2
(45) Date of Patent: *Jan. 15, 2008

(54) IMAGE DISPLAY DEVICE AND PROJECTOR

(75) Inventors: Shoichi Uchiyama, Shimo-Suwa-machi (JP); Junichi Nakamura, Shiojiri (JP); Takashi Nitta, Chino (JP); Tsunemori Asahi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/369,971

(22) Filed: Mar. 8, 2006

(65) Prior Publication Data
US 2006/0202930 A1    Sep. 14, 2006

(30) Foreign Application Priority Data
Mar. 9, 2005    (JP)    ............... 2005-066092

(51) Int. Cl.
G09G 3/00    (2006.01)
(52) U.S. Cl. .................. 345/32; 348/758; 353/31; 359/618
(58) Field of Classification Search .......... 345/89, 345/30, 32; 359/618; 353/31; 348/758
See application file for complete search history.

(56) References Cited

U.S. PATENT DOCUMENTS 5,978,142 A * 11/1999 Blackham et al. ......... 359/618

2005/0174495 A1 * 8/2005 Itoh et al. .................. 348/758

FOREIGN PATENT DOCUMENTS

| JP | A 2000-305472 | 11/2000 |
| JP | A 2001-100689 | 4/2001 |
| JP | A 2004-523001 | 7/2004 |
| WO | WO 02/069030 A2 | 9/2002 |

OTHER PUBLICATIONS

Helge Seetzen, Lorne A. Whitehead. "A High Dynamic Range Display Using Low and High Resolution Modulators," SID Symposium 2003, pp. 1450-1453 (2003).
P.E. Debevec, J. Malik. "Recovering High Dynamic Range Radiance Maps from Photographs," Proceedings of ACM SIGGRAPH97, pp. 367-378 (1997).

* cited by examiner

Primary Examiner—Amr A. Awad
Assistant Examiner—Yong Sim
(74) Attorney, Agent, or Firm—Oliff & Berridge, PLC

(57) ABSTRACT

An image display device that displays an image by modulating a light from a light source according to display image data, includes: a first light modulation element that modulates a light emitted from the light source; and a second light modulation element that is disposed on an optical path in series with the first light modulation element and modulates a light exiting from the first light modulation element, wherein an opening in a unit pixel of the first light modulation element and an opening in a unit pixel of the second light modulation element are of analogous shapes.

8 Claims, 4 Drawing Sheets

F I G. 1
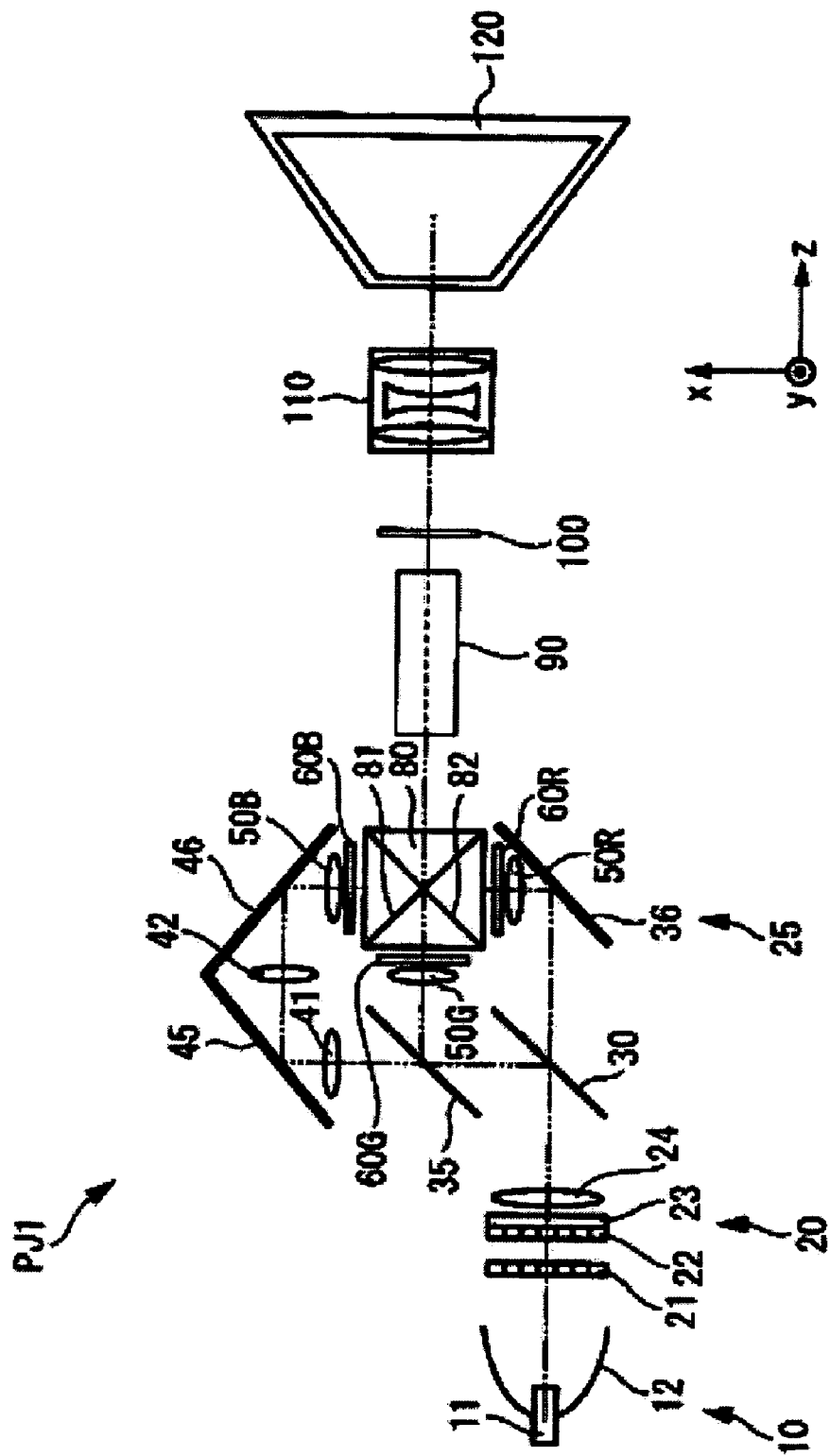

180 LIGHT VALVE DRIVING DEVICE

IMAGE DISPLAY DEVICE AND PROJECTOR

CROSS-REFERENCE TO RELATED APPLICATION

The present application claims priority to Japanese Patent Application No. 2005-066092 filed Mar. 9, 2005, which is hereby expressly incorporated by reference herein in its entirety.

BACKGROUND

1. Technical Field

The present invention relates to a device that displays an image by modulating a light from a light source via plural light modulation elements, and more particularly, to an image display device and a projector suitable to achieve a wider luminance dynamic range and a greater number of gradation steps.

2. Related Art

Improvements of an image quality in recent years with electronic display devices, such as an LCD (Liquid Crystal Display), an EL (Electro-luminescence) display, a plasma display, a CRT (Cathode Ray Tube), and a projector, are remarkable. A device with the ability comparable to the characteristics of human vision as to resolution and color gamut is now being achieved. However, the reproducible range of the luminance dynamic range is limited to a range of the order of 1 to $10^2$ [nit], and the gradation steps is normally expressed by 8 bits. On the other hand, the luminance dynamic range perceivable by the human vision at a time is in a range of the order of $10^{-2}$ to $10^{-4}$ [nit], and luminance discretion is 0.2 [nit], which is equivalent to 12 bits in terms of gradation steps. When a display image of today's display device is viewed through such vision characteristics, the narrowness of the luminance dynamic range is outstanding. In addition, because gradation in a shadow portion and a highlight portion is insufficient, the viewer is not completely satisfied with a display image in terms of reality and a visual impact.

Meanwhile, the mainstream of the CG (Computer Graphics) used in movies, games, etc. is to pursue the reality of a picture by providing display data with a luminance dynamic range and the gradation characteristic closer to those of the human vision (hereinafter, such display data is referred to as HDR (High Dynamic Range) display data). However, because the ability of a display device to display the HDR display data is inadequate, there is a problem that the expression capability inherent to CG contents is not fully exerted.

Further, for the next-generation OS (Operating System), the adaptation of a 16-bit color space is planned, and the dynamic range and the gradation steps will be widened and increased markedly in comparison with the current 8-bit color space. Hence, the need for an electronic display device capable of fully expressing the 16-bit color space by achieving a high dynamic range and a greater number of gradation steps is expected to increase.

Of the display devices, a projection type display device (projector), such as a liquid crystal projector and a DLP™ (Digital Light Processing) projector, is able to display an image on a large screen, and is therefore a display device effective when rendering a display image with reality and a visual impact. In this field, proposals as follows have been made to solve the problems discussed above.

The technique disclosed, for example, in JP-T-2004-523001 is an example of a display device achieving a high dynamic range. This display device includes a light source, a second light modulation element that modulates luminance of a light in all the wavelength regions, and a first light modulation element that modulates luminance of a light in each of the wavelength regions for three primary colors, RGB, among wavelength regions of the light. A light from the light source is modulated by the second light modulation element to form a desired luminance distribution, and the resultant optical image is formed on the display surface of the first light modulation element to modulate colors, so that a secondary-modulated light is projected. All the pixels in the second light modulation element and the first light modulation element are controlled individually according to a first control value and a second control value determined on the basis of the HDR display data. A transmissive modulation element having a pixel structure or a segment structure in which transmissivity can be controlled independently and capable of controlling a two-dimensional transmissivity distribution is used as the light modulation element. A good example is a liquid crystal light valve. Alternatively, the transmissive modulation element may be replaced with a reflective modulation element. A good example in this case is a DMD (Digital Micromirror Device).

In the case where a light modulation element whose transmissivity is 0.2% for a dark display and 60% for a bright display is used, the luminance dynamic range of a single unit of the light modulation element is 60/0.2=300. The display device is equivalent to an array of light modulation elements having the luminance dynamic range of 300 and aligned optically in series. The display device is therefore able to achieve a luminance dynamic range of 300× 300=90000. The same applies to the gradation steps, and gradation steps exceeding 8 bits can be achieved by aligning light modulation elements having 8-bit gradation optically in series.

JP-A-2001-100689 is also an example of the related art.

Incidentally, the shape of an opening in the pixel of the liquid crystal light valve is not rotational symmetric about the central axis of the image display surface. Hence, in the related art, when the light source, the first light modulation element, the image forming system, and the second light modulation element are disposed on the optical axis, the shape of an opening in the unit pixel for an optical image of the first light modulation element formed by the image forming system does not match with the shape of an opening in the unit pixel of the second light modulation element. Part of a light exiting from the first light modulation element is therefore shielded at the opening of the second light modulation element. This raises a problem that efficiency for utilization of light is reduced.

SUMMARY

An advantage of the invention is to provide an image display device and a projector capable of obtaining a sharp image by enhancing efficiency for utilization of light.

The advantage can be achieved by the configurations as follows.

A first aspect of the invention provides an image display device that displays an image by modulating a light from a light source according to display image data. The image display device includes a first light modulation element that modulates a light emitted from the light source, and a second light modulation element that is disposed on an optical path in series with the first light modulation element and modulates a light exiting from the first light modulation element.

An opening in a unit pixel of the first light modulation element and an opening in a unit pixel of the second light modulation element are of analogous (similar) shapes.

According to the first aspect of the invention, because the opening in the unit pixel of the first light modulation element and the opening in the unit pixel of the second light modulation element are of analogous shapes, the optical image of the first light modulation element that goes incident on the second light modulation element almost matches with the shape of the opening of the second light modulation element. A ratio of a light shielded by the second light modulation element can be therefore reduced. As a consequence, almost the entire light exiting from the first light modulation element passes through the opening of the second light modulation element. Efficiency for utilization of light can be thus enhanced.

It is preferable that the image forming device further includes an image forming system that forms an optical image of the first light modulation element on a light-receiving surface of the second light modulation element.

In the image display device configured as above, brightness, chromaticity, contrast, etc. can be made homogeneous in a reliable manner and the image display quaintly can be satisfactorily.

It is preferable that the image forming system is an inverted image forming portion, and that a size of the opening in the unit pixel of the second light modulation element with respect to a size of the opening in the unit pixel of the first light modulation element corresponds to magnification of the image forming system while the first light modulation element and the second light modulation element are disposed to be rotational symmetric by 180° about an optical axis.

A light emitted from the light source is modulated by the first light modulation element. The optical image thus modulated is formed as an inverted image on the light-receiving surface of the second light modulation element because the image forming portion is the inverted image forming portion. Even when the optical image exiting from the first light modulation element is rotated by 180° as described above, because the opening in the unit pixel of the second light modulation element is of a size corresponding to the magnification of the image forming system, and the first light modulation element and the second light modulation element are disposed to be rotational symmetric by 180° about the optical axis, a light exiting from the first light modulation element will not be shielded at the opening of the second light modulation element. In short, even when the inverted image forming portion is used, almost the entire light exiting from the first light modulation element passes through the opening of the second light modulation element. Efficiency for utilization of light can be thus enhanced.

It is preferable that the first light modulation element is formed of plural light modulation elements each modulating a different color light, and that the image display device further comprises a dichroic prism that combines lights modulated in the plural light modulation elements while a shape of the opening in the unit pixel of the second light modulation element is matched with a shape of the opening in the unit pixel of a light modulation element from which a light that passes through the dichroic prism exits.

Because the shape of the opening of the second light modulation element is matched with the shape of the opening of the light modulation element from which a light that passes through the dichroic prism exits, the shapes of the openings can be matched with each other by a simple method. This not only prevents an increase of the overall device in size, but also saves the cost because the components can be fewer.

A second aspect of the invention provides a projector that includes the image display device as described above, and a projection system that projects a light exiting from image display device.

According to the second aspect of the invention, an image exiting from the image display device is projected by means of the projection system. As has been described, because the image display device allows a light exiting from the first light modulation element to pass through the opening of the second light modulation element without a loss, it is possible to obtain a display image in a high dynamic range having an excellent gradation characteristic.

BRIEF DESCRIPTION OF THE DRAWINGS

The invention will be described with reference to the accompanying drawings, wherein like numbers reference like elements.

FIG. 1 is a view schematically showing a projector according to a first embodiment of the invention.

DESCRIPTION OF EXEMPLARY EMBODIMENTS

Figure 2:
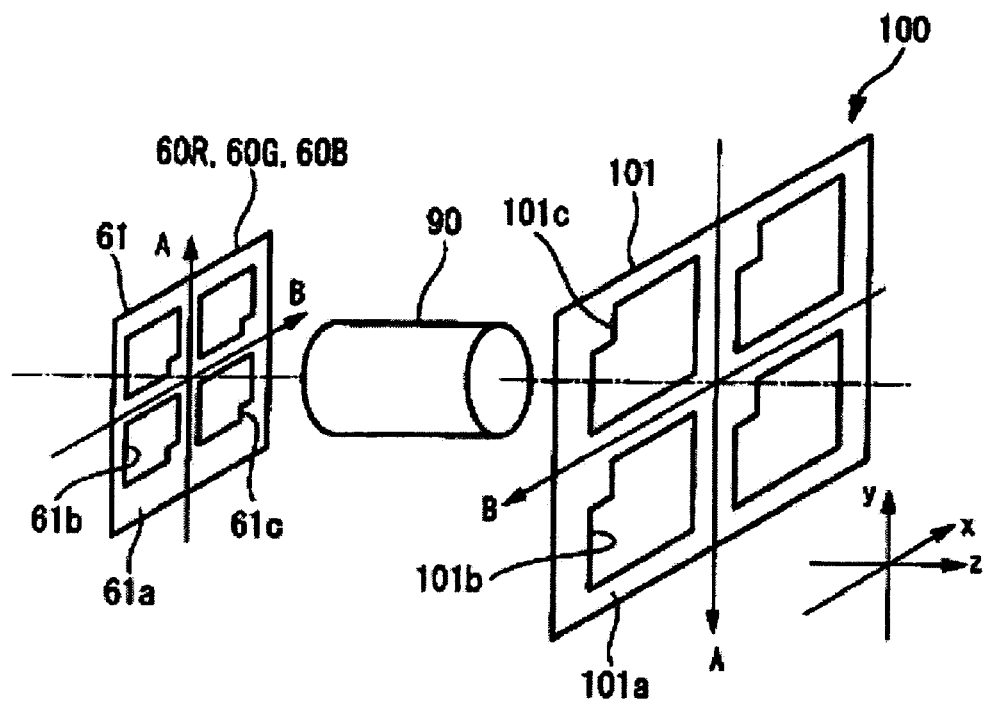
FIG. 2 is a perspective view showing locations and the shapes of liquid crystal light valves of FIG. 1.

Hereinafter, embodiments of an image display device and a projector of the invention will be described with reference to the drawings.

First Embodiment of Projector

FIG. 1 is a view showing the major optical configuration of a projection type liquid crystal display device (projector) PJ1.

The projector PJ1 comprises an image display device including: a light source 10; a uniform illumination system 20 that makes a luminance distribution of a light coming incident thereon from the light source 10 uniform; a color modulation portion 25 that modulates luminance of three primary colors, RGB, among the wavelength regions of a light coming incident thereon from the uniform illumination system 20 (including three transmissive liquid crystal light valves as a first modulation element, that is, a transmissive liquid crystal light valve 60B for a blue light, a transmissive liquid crystal light valve 60G for a green light, and a transmissive liquid crystal light valve 60R for a red light); a relay lens 90 that relays a light coming incident thereon from the color modulation portion 25; and a transmissive liquid crystal light valve 100 serving as a second modulation portion that modulates luminance of a light coming incident thereon from the relay lens 90 in all the wavelength regions, and a projection lens (projection system) 110 that projects a light coming incident thereon from the liquid crystal light valve 100 onto a screen 120.

The light source 10 includes a lamp 11 comprising an ultra-high pressure mercury vapor lamp or a xenon lamp, and a reflector 12 that reflects or collects a light emitted from the lamp 11.

Hereinafter, assume that in the xyz orthogonal coordinate system of the overall optical system, a pixel surface of the transmissive liquid crystal light valve 100 is defined as the xy plane, and the direction of a light exiting from a cross dichroic prism 80 and heading toward the projection lens 110 is defined as the z direction.

The uniform illumination system 20 comprises first and second lens arrays 21 and 22 formed of fly-eye lenses or the like, a polarization conversion element 23, and a collector lens 24. The luminance distribution of a light emitted from the light source 10 is made uniform by the first and second lens arrays 21 and 22. A light having passed through the first and second lens arrays 21 and 22 is then polarized by the polarization conversion element 23 to a polarization direction in which the light is allowed to go incident on the color modulation portion 25. The polarized light is collected by the collector lens 24 so that it exits toward the color modulation portion 25. The polarization conversion element 23 is formed of, for example, a PBS array and a ½ wave plate, and converts a random polarized light to a specific linear polarized light.

The color modulation portion 25 comprises two dichroic mirrors 30 and 35 serving as light separation portions, three mirrors (reflection mirrors 36, 45, and 46), five field lenses (a lens 41, a relay lens 42, parallelizing lenses 50B, 50G, and 50R), three liquid crystal light valves 60B, 60G, and 60R, and a cross dichroic prism 80.

The dichroic mirrors 30 and 35 separate (isolate) a light (a white light) from the light source 10 to lights of three primary colors, RGB representing red (R), green (G), and blue (B). The dichroic mirror 30 comprises a glass plate or the like and a dichroic filter formed on the glass plate and having a property of reflecting a B light and a G light and transmitting an R light. Of a white light from the light source 10, it reflects a B light and a G light and transmits an R light included in the white light. The dichroic mirror 35 comprises a glass plate or the like and a dichroic filter formed on the glass plate and having a property of reflecting a G light and transmitting a B light. Of the G light and the B light reflected on the dichroic mirror 30, it reflects the G light so that it is conveyed to the parallelizing lens 50G, and transmits the B light so that it is conveyed to the lens 41.

The relay lens 42 conveys a light (light intensity distribution) in the vicinity of the lens 41 to the vicinity of the parallelizing lens 50B. The lens 41 is furnished with a function of allowing a light to go incident on the relay lens 42 efficiently. The B light that comes incident on the lens 41 is conveyed to the spatially remote liquid crystal light valve 60B while maintaining the intensity distribution almost intact and hardly causing a light loss.

The parallelizing lenses 50B, 50G, and 50R are furnished with functions of making lights of respective colors that go incident on the corresponding liquid crystal light valves 60B, 60G, and 60R substantially parallel, so that lights having passed through the liquid crystal light valves 60B, 60G, and 60R go incident on the relay lens 90 efficiently. Lights of three primary colors, RGB, separated by the dichroic mirrors 30 and 35 go incident on the liquid crystal light valves 60B, 60G, and 60R via the mirrors (the reflection mirrors 36, 45, and 46) and the lenses (the lens 41, the relay lens 42, and the parallelizing lenses 50B, 50G, and 50R) described above.

Each of the liquid crystal light valves 60B, 60G, and 60R is an active-matrix liquid crystal display element comprising a glass substrate, on which pixel electrodes and switching elements to drive the pixel electrodes, such as thin-film transistor elements and thin-film diodes, are formed in a matrix fashion, a glass substrate on which a common electrode is formed entirely, TN-type liquid crystal sandwiched between these substrates, and polarizers disposed on the outer surfaces.

The liquid crystal light valves 60B, 60G, and 60R are driven in a normally white mode in which they are in a white/bright (transmissive) state while no voltage is applied and in a black/dark (non-transmissive) state while a voltage is applied or in an opposite normally black mode. The gradation from bright to dark is controlled in an analog manner according to a control value being given. The liquid crystal light valve 60B modulates a B light coming incident thereon according to display image data, and a modulated light is emitted from the liquid crystal light valve 60B. The liquid crystal light valve 60G modulates a G light coming incident thereon according to display image data, and a modulated light is emitted from the liquid crystal light valve 60G. The liquid crystal light valve 60R modulates an R light coming incident thereon according to display image data, and a modulated light is emitted from the liquid crystal light valve 60R.

The cross dichroic prism 80 is of a structure in which four rectangular prisms are laminated to each other, and inside the structure are formed a dielectric multi-layer filter that reflects a B light (B light reflecting dichroic filter 81) and a dielectric multi-layer filter that reflects an R light (R light reflecting dichroic filter 82) with their cross sections placed in the form of a letter X. It therefore transmits a G light from the liquid crystal light valve 60G and bends an R light from the liquid crystal light valve 60R and a B light from the liquid crystal light valve 60B to combine these lights of three colors for a color image to be formed.

The relay lens 90 conveys optical images (light intensity distributions) from the liquid crystal light valves 60B, 60G, and 60R that are combined in the cross dichroic prism 80 to the pixel surface (light-receiving surface) of the liquid crystal light valve 100. Because the relay lens 90 used in this embodiment is an inverted image forming portion, images exiting from the liquid crystal light valves 60B, 60G, and 60R are formed on the liquid crystal light valve 100 via the relay lens 90 as an inverted image. In addition, the magnification of the relay lens 90 used in this embodiment is about two times.

As is shown in FIG. 1, the liquid crystal light valve 100 is of the same configuration as the liquid crystal light valves 60B, 60G, and 60R as described above. It modulates luminance of a light coming incident thereon in all the wavelength regions according to the display image data, and a modulated light is emitted from the liquid crystal light valve 100 toward the projection lens 110.

The transmissive liquid crystal light valves 60B, 60G, 60R, and 100 are liquid crystal light valves. As is shown in FIG. 2, according to the pixel structure of these light valves, plural unit pixels 61 and 101 are aligned in a matrix fashion, and the unit pixels 61 and 101 comprise, respectively, grid-like light shielding portions 61a and 101a made of a metal material, such as chromium, and rectangular openings 61b and 101b. When configured in this manner, of lights coming incident on the liquid crystal light valves 60B, 60G, 60R, and 100, those coming incident on the openings 61b and 101b are allowed to pass through intact, whereas those coming incident on the light shielding portions 61a and 101a are shielded. In the example shown in the drawing, only four unit pixels 61 and four unit pixels 101 are shown.

Each of the light shielding portions 61a and 101a is formed of a light shielding pattern film (a black stripe film, a black matrix film, etc.), in which strip-shaped portions of a specific width are aligned periodically, as well as pixel wires, TFT elements, etc. Light shielding portions 61c and 101c are provided, respectively, to the openings 61b and 101b at one corner. As has been described, the light shielding portions 61a and 101a are of asymmetric shapes.

Further, the opening 61b in the unit pixel 61 of the liquid crystal light valves 60B, 60G, and 60R and the opening 101b in the unit pixel 101 of the liquid crystal light valve 100 are of analogous (similar) shapes. To be more concrete, because the magnification of the relay lens 90 is two times, the opening 101b of the liquid crystal light valve 100 is about twice as large as the opening 61b of the liquid crystal light valves 60B, 60G, and 60R. In short, the analogous ratio is 1:2.

The liquid crystal light valve 100 is disposed to be rotational symmetric by 180° about the optical axis in reference to the liquid crystal light valves 60B, 60G, and 60R. In other words, the liquid crystal light valves 60B, 60, and 60R are disposed in such a manner that the direction A and the direction B of the liquid crystal light valves 60B, 60G, and 60R are set in the +y direction and the +x direction, respectively. Meanwhile, the liquid crystal light valve 100 is rotated by 180° about the optical axis in reference to the liquid crystal light valves 60B, 60G, and 60R, while the direction A and the direction B are set to the −y direction and the −x direction, respectively. When disposed in this manner, it is possible to match the optical images of the liquid crystal light valves 60B, 60G, and 60R formed by the relay lens 90 with the shape of the opening 101b of the liquid crystal light valve 100.

The projection lens 110 projects an optical image formed on the display surface of the liquid crystal light valve 100 onto the screen 120 for a color image to be displayed.

The liquid crystal light valves 60B, 60G, and 60R and the liquid crystal light valve 100 are the same in that they modulate the intensity of a transmitted light and bear optical images corresponding to the degree of modulation. However, they are different in that the liquid crystal light valve 100 modulates a light (white light) in all the wavelength regions, whereas the liquid crystal light valves 60B, 60G, and 60R modulate lights in specific wavelength regions (lights of colors, such as R, G and B lights) separated in the dichroic mirrors 30 and 35 serving as the light separation portions. For this reason, the light intensity modulation performed by the liquid crystal light valves 60B, 60G, and 60R is referred to as color modulation, and the light intensity modulation performed by the liquid crystal light valve 100 is referred to as luminance modulation for the purpose of distinction.

From the same point of view, hereinafter, the liquid crystal light valves 60B, 60G, and 60R are referred to as the color modulation light valves, and the liquid crystal light valve 100 is referred to as the luminance modulation light valve for distinction.

An overall flow to convey a light in the projector PJ1 will now be described. A white light from the light source 10 is separated into lights of three primary colors including red (R), green (G), and blue (B) by the dichroic mirrors 30 and 35, and the separated lights go incident on the corresponding liquid crystal light valves 60B, 60G, and 60R via the lenses including the parallelizing lenses 50B, 50G, and 50R and the mirrors. The lights of respective colors coming incident on the liquid crystal light valves 60B, 60G, and 60R are modulated in color according to the outside data corresponding to their respective wavelength regions, and exit as modulated lights bearing optical images. The respective modulated lights from the liquid crystal light valves 60B, 60G, and 60R independently go incident on the cross dichroic prism 80, and are combined therein into a single light.

Thereafter, the light exiting from the cross dichroic prism 80 goes incident on the liquid crystal light valve 100 via the relay lens 90. In this instance, the optical image of the light exiting from the cross dichroic prism 80 is rotated by 180° and is enlarged by two times at the same time by the relay lens 90, so that it almost matches with the shape of the opening 101b of the liquid crystal light valve 100. The combined light coming incident on the liquid crystal light valve 100 is modulated in luminance according to the outside data corresponding to all the wavelength regions. In this instance, the light that exits from the cross dichroic prism 80 and heads toward the liquid crystal light valve 100 passes through the openings 101b of the liquid crystal light valve 100 almost entirely. The light then exits to the projection lens 110 as a modulated light bearing the final optical image. Further, the projection lens 110 projects the final combined light from the liquid crystal light valve 100 onto the screen 120 for a desired image to be displayed.

As has been described, the projector PJ1 adopts a mode in which a final display image is formed in the liquid crystal light valve 100 serving as the second light modulation element using modulated lights forming the optical images (images) in the liquid crystal light valves 60B, 60G, and 60R serving as the first light modulation element. Herein, a light from the light source 10 is modulated through the two-step image forming process via the two light modulation elements (the color modulation light valves and the luminance modulation light valve) disposed in series. The image forming process is described, for example, in Helge Seetzen, Lorne A. Whitehead, "A High Dynamic Range Display Using Low and High Resolution Modulators", *SID Symposium* 2003, pp. 1450-1453, 2003. The projector PJ1 is thus able to achieve a wider luminance dynamic range and a greater number of gradation steps.

The projector PJ1 is further provided with a display control device 200 that controls the projector PJ1.

Figure 3:
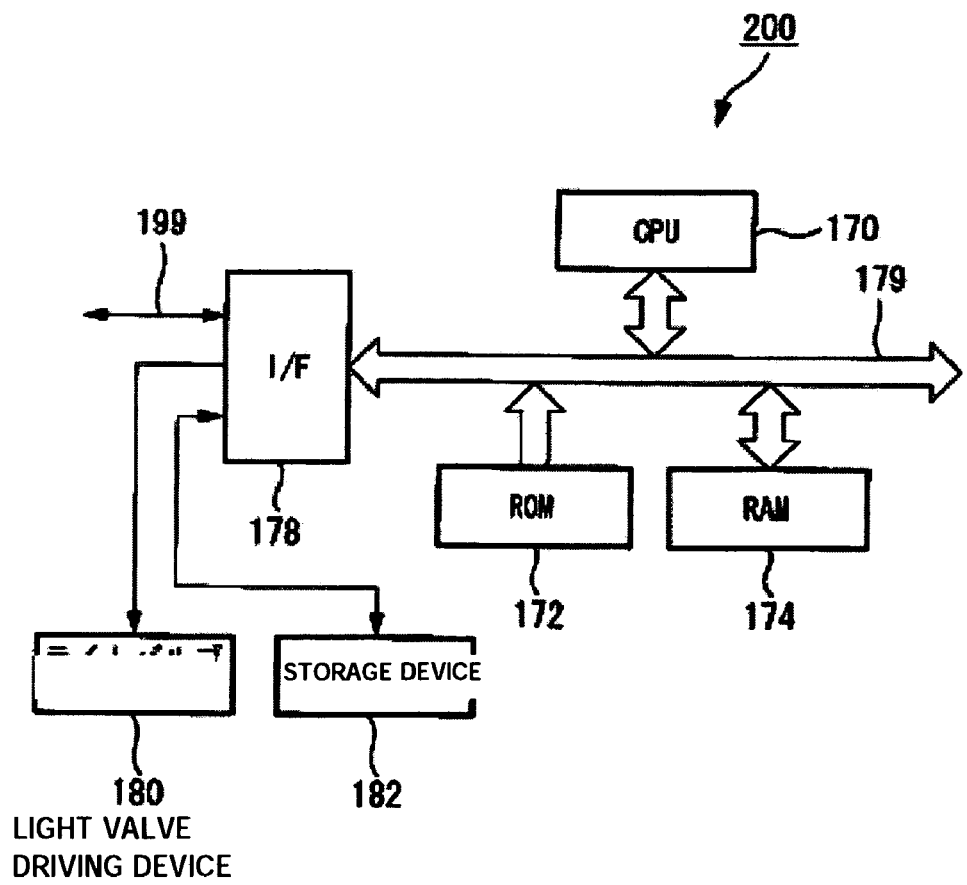
FIG. 3 is a block diagram showing the hardware configuration of a display control device used in the projector according to the first embodiment of the invention.

FIG. 3 is a block diagram showing the hardware configuration of the display control device 200.

As is shown in FIG. 3, the display control device 200 comprises a CPU 170 that performs computations and controls the overall system by running the control program, a ROM 172 that pre-stores the control program of the CPU 170 and the like in a specified region, a RAM 174 that stores data read out from the ROM 172 or the like and the computation result needed for the CPU 170 during its computation process, and an I/F 178 that serves as a medium for inputting/outputting data to/from the outside devices. These components are interconnected via a bus 179 serving as a data transfer signal line to enable mutual data transmission.

The I/F 178 is connected to outside devices, such as a light valve driving device 180 that drives the luminance modulation light valve and the color modulation light valves, a storage device 182 that stores data, a table, etc. in the form of files, and a signal line that establishes a connection with an outside network 199.

The storage device 182 stores HDR display data used to drive the luminance modulation light valve and the color modulation light valves, and a control value registration table.

In this embodiment, the projector PJ1 is configured to control transmissivity of the liquid crystal light valves 60B, 60G, and 60R and the liquid crystal light valve 100 by means of the display control device 200 according to an HDR video signal and RGB from the outside, so that an HDR image is displayed on the screen 120.

The HDR image data is image data that can achieve a high luminance dynamic range that cannot be achieved by an image format, such as sRGB, in the related art. A pixel value indicating the luminance level of the pixel is stored for all the pixels forming the image. In a format used as the HDR display data in this embodiment, a pixel value that indicates the pixel level for each of the three primary colors, RGB, as a floating point value, is stored for each pixel. For example, values, (1.2, 5.4, 2.3), are stored as the pixel value for a single pixel.

Also, an HDR image in a high luminance dynamic range is captured and the HDR image data is generated on the basis of the HDR image.

The generation method of the HDR image data is described in detail, for example, in a known paper, P. E. Debevec, J. Malik, "Recovering High Dynamic Range Radiance Maps from Photographs", *Proceedings of ACM SIGGRAPH*97, pp. 367-378, 1997.

COMPARATIVE EXAMPLE

As a comparative example to describe the projector PJ1 of the invention, liquid crystal light valves of the structure in the related art, that is, those having the pixel structures 61 and 101 shown in FIG. 2 are used as the liquid crystal light valves 60B, 60G, and 60R and the liquid crystal light valve 100. Then, as is shown in FIG. 4A, they are disposed on the optical path to face the same direction.

Figure 4:
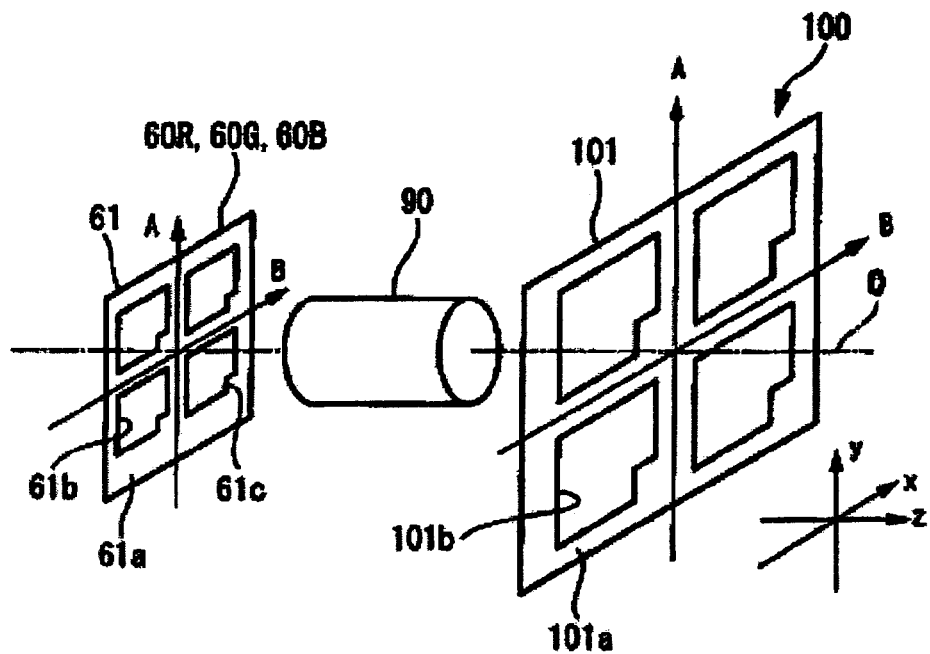
FIG. 4A is a perspective view showing a comparative example of locations of the liquid crystal light valves in the projector according to the first embodiment of the invention.
FIG. 4B is a view showing images of openings of the liquid crystal light valves in the comparative example.
Figure 4:
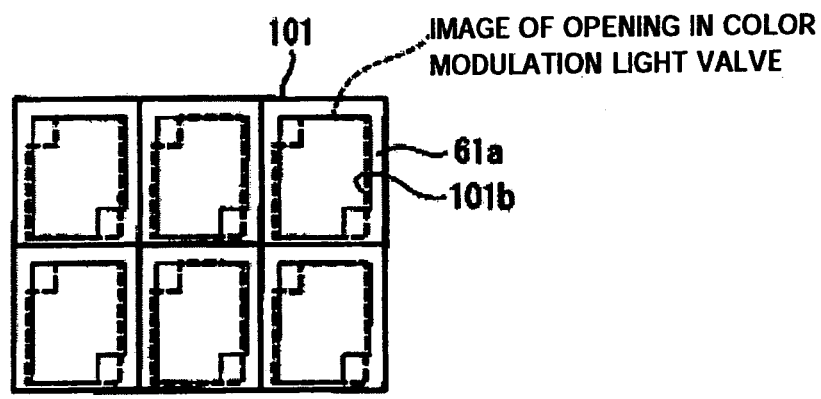

When configured in this manner, because the relay lens 90 is the inverted image forming portion, as is shown in FIG. 4B, images of the openings of the liquid crystal light valves 60B, 60G, and 60R formed on the pixel surface of the liquid crystal light valve 100 are those indicated by a dotted line, which do not match with the shape of the openings 101*b* of the liquid crystal light valve 100. Part of a light coming incident on the liquid crystal light valve 100 is therefore shielded. This results in a reduction of efficiency for utilization of light emitted from the light source 10.

As has been described, the projector PJ1 of this embodiment is able to subject a light having undergone primary modulation in specific pixels in the color modulation light valves 60R, 60G, and 60B to secondary modulation adequately in a specific region (pixels) in the luminance modulation light valve 100. It is thus possible to obtain an image having a specific quality in a reliable manner in comparison with the related art.

In addition, because the opening 61*b* of the liquid crystal light valves 60B, 60G, and 60R and the opening 101*b* of the liquid crystal light valve 100 are of analogous shapes, the images of the openings 61*b* of the liquid crystal light valves 60B, 60G, and 60R almost match with the shapes of the openings 101*b* of the liquid crystal light valve 100. A ratio of a light shielded by the light shielding portion 101*a* can be therefore smaller than in the related art. This allows almost the entire lights exiting from the liquid crystal light valves 60B, 60G, and 60R to pass through the openings 101*b* of the liquid crystal light valve 100. Efficiency for utilization of light is thereby enhanced.

The technical scope of the invention is not limited to the embodiment above, and the invention can be modified in various manners without deviating from the scope of the invention.

Figure 5:
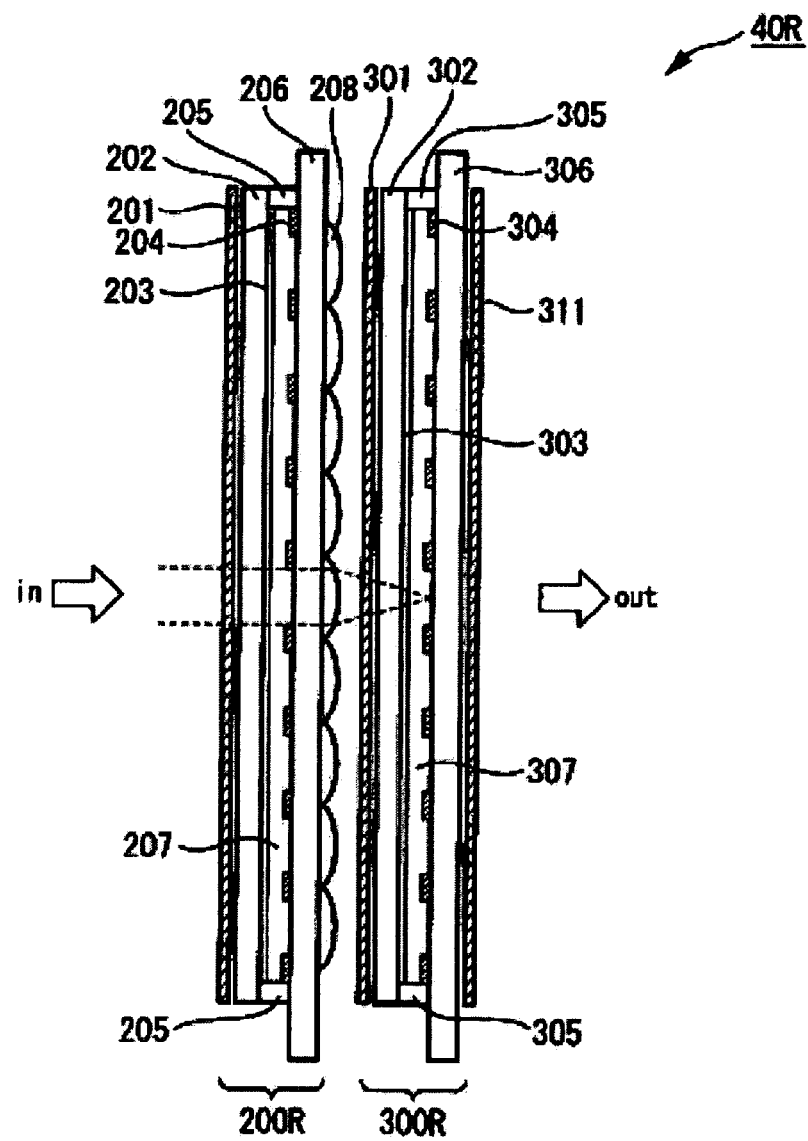
FIG. 5 is a cross section showing a modification of color modulation light valves and a luminance modulation light valve in the projector according to the first embodiment of the invention.

For example, in the embodiment above, the relay lens 90 may be omitted from the projector PJ1. When configured in this manner, as is shown in FIG. 5, light modulation element groups 40R, 40G, and 40B comprising, respectively, liquid crystal light valves (luminance modulation light valves) 200R, 200G, and 200B in which plural pixels whose transmissivity can be controlled independently are aligned in a matrix fashion, and liquid crystal light valves (color modulation light valves) 300R, 300G, and 300B in which plural pixels whose transmissivity can be controlled independently are aligned in a matrix fashion, are disposed at the positions of the liquid crystal light valves 60B, 60G, and 60R instead of the liquid crystal light valves 60B, 60G, 60R, and 100. This case will be described with reference to FIG. 5 using the light modulation element group 40R for red as an example.

The liquid crystal light valve 200R comprises a polarizer 201, a counter substrate 202, a counter electrode 203, data wires 204, a sealing member 205, a panel substrate 206, liquid crystal 207, and a micro-lens array 208. The data wires 204 for respective pixels, pixel electrodes (not shown) aligned at regular intervals, and active elements (not shown) used to apply a control voltage to the pixel electrodes are formed on the panel substrate 206 on the light incident side (the side on which a light from the light source 10 comes incident). The counter electrode 203 is formed on the counter substrate 202. A space between the panel substrate 206 and the counter substrate 202 is filled with the liquid crystal 207, and the liquid crystal 207 is sealed by the sealing member 205. The polarizer 201 is laminated to the counter substrate 202 on the light incident side. Meanwhile, the micro-lens array 208 is laminated to the panel substrate 206 on the light exiting side (the side from which a light from the light source 10 exits) with the convex direction facing the light exiting side. The micro-lens array 208 can be manufactured by the manufacturing method disclosed, for example, in JP-A-2000-305472.

The liquid crystal light valve 300R comprises a polarizer 301, a counter substrate 302, a counter electrode 303, data wires 304, a sealing member 305, a panel substrate 306, liquid crystal 307, and a polarizer 311. The data wires 304 for the respective pixels, pixel electrodes (not shown) aligned at regular intervals, and active elements (not shown) used to apply a control voltage to the pixel electrodes are formed on the panel substrate 306 on the light incident side. The counter electrode 303 is formed on the counter substrate 302. A space between the panel substrate 306 and the counter substrate 302 is filled with the liquid crystal 307, and the liquid crystal 307 is sealed by the sealing member 305. The polarizer 301 is laminated to the counter substrate 302 on the light incident side. Meanwhile, the polarizer 311 is laminated to the panel substrate 306 on the light exiting side.

A light emitted from the homogenous illumination system 20 comes incident on the liquid crystal light valve 200R from the left (the direction, in) of FIG. 5, and is primary modulated therein. The optical image of the liquid crystal light valve 200R is then conveyed to the liquid crystal light valve 300R via the micro-lens array 208. In this instance, the optical image of the liquid crystal light valve 200R is collected by the micro-lens array 208 and formed on the pixel surface of the liquid crystal light valve 300R. The optical image can be therefore conveyed to the liquid crystal light valve 300R while suppressing a reduction in luminance caused by dispersion of the light or the like. Subsequently, the light from the liquid crystal light valve 200R is secondary modulated by the liquid crystal light valve 300R, and exits therefrom to the right (the direction, out) of FIG. 5 to be conveyed to the cross dichroic prism 80.

As has been described, according to the configuration by superimposing the color modulation light valve 300R, the micro-lens array 208, and the luminance modulation light valve 200R, the overall device can be reduced in size because the micro-lens array 208 is quite small in comparison with the relay lens 90. Further, because the micro-lens array 208 has fewer components than the relay lens 90, errors at the incorporated positions to the device can be fewer. An optical image of the luminance modulation light valve 200R can be therefore formed at relatively good accuracy on the pixel surface of the color modulation light valve 300R. In addition, because the luminance modulation light valve, the micro-lens array 208, and the color modulation light valve are disposed closely, a reduction in luminance caused by dispersion of light or the like can be further suppressed. Luminance of the display image can be thereby enhanced.

Also, the description was given using liquid crystal light valves provided with openings of asymmetric shapes as the liquid crystal light valves 60B, 60G, 60R, and 100. However, the openings 61b and 101b of the liquid crystal light valves 60B, 60G, 60R, and 100 may be of a symmetric rectangular shape. In this case, too, by making the relation between the shape of the opening 61b of the liquid crystal light valves 60B, 60G, and 60R and the shape of the opening 101b of the liquid crystal light valve 100 to a relation corresponding to the magnification of the relay lens 90, lights exiting from the liquid crystal light valves 60B, 60G, and 60R will not be shielded at the openings 101b of the liquid crystal light valve 100. Efficiency for utilization of light can be therefore enhanced.

Figure 6:
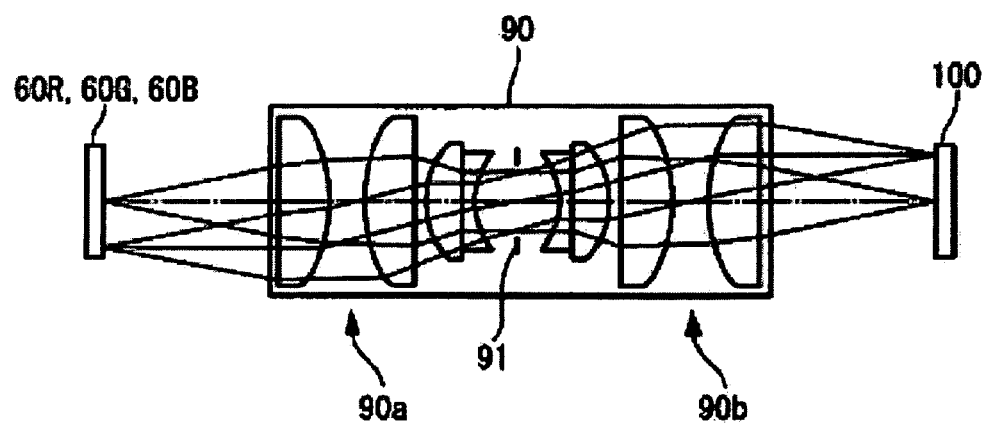
FIG. 6 is a plan view showing a modification of a relay lens in the projector according to the first embodiment of the invention.

In the embodiment above, the magnification of the relay lens 90 is set to two times. However, as is shown in FIG. 6, the relay lens 90 may be a same-size image forming lens comprising a first-half lens group 90a and a second-half lens group 90b disposed to be almost symmetric with respect to an aperture diaphragm 91. In this case, it is preferable for the relay lens 90 to have a both-sides telecentric characteristic by taking the view angle characteristic of liquid crystal into account. For the relay lens 90 of this type, the image side focal position of the first-half lens group 90a, the aperture diaphragm 91, and the object side focal position of the second-half lens group 90b are made to coincide with one another, and the liquid crystal light valves 60B, 60G, and 60R are disposed at the object side focal position of the first-half lens group 90a while the liquid crystal light valve 100 is disposed at the image side focal position of the second-half lens group 90b. The first-half lens group 90a and the second-half lens group 90b include plural convex lenses and concave lenses. It should be noted, however, that the shape, the size, intervals, and the number of the lenses, and the telecentric characteristic, the magnification, and other lens characteristics of the lenses can be changed as needed to meet the required characteristics, and the lens groups are not limited to the example shown in FIG. 6.

Alternatively, the color modulation liquid crystal light valves 60B, 60G, and 60R and the luminance modulation light valve 100 may be designed individually according to the magnification of the relay lens 90, so that the openings in the unit pixels of the respective liquid crystal light valves are matched with each other.

The projector PJ1 is configured in such a manner that modulation takes place in order of the liquid crystal light valve 60B, 60G, and 60R, the relay lens 90, and the liquid crystal light valve 100 from the light source 10 side. However, the same advantage can be achieved when the PJ1 is configured in a contrary manner that modulation takes place in order of the liquid crystal light valve 100, the relay lens 90, the liquid crystal light valves 60B, 60G, and 60R from the light source 10 side.

The embodiment above described the three-plate projector as an example. However, the invention is also applicable to a single-plate projector. The single-type projector chiefly comprises a light source, a uniform illumination system, a first light modulation element, a relay lens system, a second light modulation element, and a projection lens. When a white light source is adopted as the light source, a color filter is provided to the liquid crystal light valve serving as the first light modulation element or the second light modulation element.

While the invention has been described using a projection type image display device as an example, the invention is also applicable to a direct-view image display device. The direct-view display device allows the viewer to view directly an image light modulated on the second light modulation element. The direct-view display device is advantageous in that it is suitable for viewing in a bright place.

The projector PJ1 is configured in such a manner that a light that has been modulated in color in the color modulation light valves is modulated in luminance in the luminance modulation light valve. However, the invention is not limited to this configuration, and it is possible to configure in such a manner that a light that has been modulated in luminance in the luminance modulation light valve is modulated in color in the color modulation light valves. Also, the projector PJ1 is configured in such a manner that the luminance of a light is modulated in two steps using the luminance modulation light valve and the color modulation light valves. However, the invention is not limited to this configuration, and it is possible to configure in such a manner that luminance of a light is modulated in two steps using two sets of luminance modulation light valves.

In the embodiment above, the light source comprising a single unit that emits a white light is used as the light source 10, and the white light is separated into lights of three primary colors, RGB. However, the invention is not limited to this configuration. It is possible to configure in such a manner that the portion to separate a white light is omitted, and instead, three light sources corresponding to the respective three primary colors, RGB, that is, a light source that emits an R light, a light source that emits a B light, and a light source that emits a B light, are provided.

In the embodiment above, active-matrix liquid crystal display elements are used as the liquid crystal light valves 60B, 60G, 60R, and 100. However, the invention is not limited to this configuration, and passive-matrix liquid crystal display elements and segment liquid crystal display elements can be used as the liquid crystal light valves 60B, 60G, 60R, and 100. The active-matrix liquid crystal display element is advantageous in that accurate gradation display is enabled. The passive-matrix liquid crystal display element and the segment liquid crystal display element are advantageous in that they can be manufactured at a low cost.

What is claimed is:

1. An image display device, comprising:
   a light source;
   a first light modulation element that modulates a light emitted from the light source based on display image data;
   a second light modulation element that is disposed on an optical path in series with the first light modulation element and that modulates a light exiting from the first light modulation element; and
   an opening in a unit pixel of the first light modulation element and an opening in a unit pixel of the second light modulation element being of analogous shapes; and
   the first light modulation element and the second light modulation element being disposed to be rotationally symmetric by 180° about an optical axis.

2. The image display device according to claim 1, further comprising:
   an image forming system that forms an optical image of the first light modulation element on a light-receiving surface of the second light modulation element.

3. The image display device according to claim 2,
   the image forming system being an inverted image forming portion;
   a size of the opening in the unit pixel of the second light modulation element with respect to a size of the opening in the unit pixel of the first light modulation element corresponding to a magnification of the image forming system.

4. The image display device according to claim 1,
   the first light modulation element including a plurality of light modulation elements, each modulating a different color light;
   the image display device further including a dichroic prism that combines lights modulated in the plurality light modulation elements; and
   a shape of the opening in the unit pixel of the second light modulation element being matched with a shape of the opening in the unit pixel of the light modulation elements from which a light that passes through the dichroic prism exits.

5. A projector, comprising:
   an image display device that displays an image by modulating a light from a light source according to display image data that includes:
   a first light modulation element that modulates the light emitted from the light source;
   a second light modulation element that is disposed on an optical path in series with the first light modulation element and that modulates a light exiting from the first light modulation element;
   an opening in a unit pixel of the first light modulation element and an opening in a unit pixel of the second light modulation element being of analogous shapes; and
   a projection system that projects light exiting from image display device; and
   the first light modulation element and the second light modulation element being disposed to be rotationally symmetric by 180° about an optical axis.

6. The projector according to claim 5, further comprising:
   an image forming system that forms an optical image of the first light modulation element on a light-receiving surface of the second light modulation element.

7. The projector according to claim 6, the image forming system being an inverted image forming portion;
   a size of the opening in the unit pixel of the second light modulation element with respect to a size of the opening in the unit pixel of the first light modulation element corresponding to a magnification of the image forming system.

8. The projector according to claim 5,
   the first light modulation element including a plurality of light modulation elements, each modulating a different color light;
   the image display device further including a dichroic prism that combines lights modulated in the plurality light modulation elements; and
   a shape of the opening in the unit pixel of the second light modulation element being matched with a shape of the opening in the unit pixel of the light modulation elements from which a light that passes through the dichroic prism exits.

* * * * *